US012013955B2

(12) United States Patent
Bieger

(10) Patent No.: US 12,013,955 B2
(45) Date of Patent: Jun. 18, 2024

(54) METHOD AND DEVICE FOR TRANSFERRING A BOOT CODE WITH IMPROVED DATA SECURITY

(71) Applicant: Continental Automotive GmbH, Hannover (DE)

(72) Inventor: Stefan Bieger, Nidda (DE)

(73) Assignee: Continental Automotive GmbH, Hannover (DE)

( * ) Notice: Subject to any disclaimer, the term of this patent is extended or adjusted under 35 U.S.C. 154(b) by 374 days.

(21) Appl. No.: 17/608,001

(22) PCT Filed: Apr. 29, 2020

(86) PCT No.: PCT/EP2020/061814
§ 371 (c)(1),
(2) Date: Nov. 1, 2021

(87) PCT Pub. No.: WO2020/221776
PCT Pub. Date: Nov. 5, 2020

(65) Prior Publication Data
US 2022/0292206 A1 Sep. 15, 2022

(30) Foreign Application Priority Data
May 2, 2019 (DE) ...................... 10 2019 206 302.0

(51) Int. Cl.
*G06F 21/60* (2013.01)
*G06F 9/4401* (2018.01)
(Continued)

(52) U.S. Cl.
CPC .......... *G06F 21/606* (2013.01); *G06F 9/4401* (2013.01); *H04L 9/0825* (2013.01); *H04L 9/30* (2013.01)

(58) Field of Classification Search
CPC ...... G06F 21/606; G06F 9/4401; G06F 21/57; H04L 9/0825; H04L 9/30
See application file for complete search history.

(56) References Cited

U.S. PATENT DOCUMENTS

| 8,631,239 B2 | 1/2014 | Djabarov et al. |
| 9,454,662 B1 | 9/2016 | Buendgen et al. |

(Continued)

FOREIGN PATENT DOCUMENTS

| CN | 1771691 A | 5/2006 |
| CN | 101206704 A | 6/2008 |

(Continued)

OTHER PUBLICATIONS

International Search Report and Written Opinion dated Aug. 7, 2020 from corresponding International Patent Application No. PCT/EP2020/061814.

(Continued)

*Primary Examiner* — Ellen Tran

(57) ABSTRACT

A method for transmitting a boot code, with improved data security, from a programming device to a microcontroller, including: a) creating a first public key, a first private key, and a password; b) generating a bootloader binary for execution on the microcontroller, c) estimating a tolerable total processing time, which consists of the processing times of steps d) to f); d) transmitting the bootloader binary from the programming device to the microcontroller; e) executing, by the microcontroller, the bootstrap loader code, the decryption routine, and the decrypted bootloader routines; f) transmitting at least the second public key from the microcontroller to the programming device; g) if the actual processing times of steps d) to f) are outside the tolerable total processing time, terminating the method; and h) otherwise, encrypting, by the programming device, the boot (Continued)

code by the second public key and transmitting an encrypted boot code to the microcontroller.

8 Claims, 1 Drawing Sheet

(51) Int. Cl.
 *H04L 9/08* (2006.01)
 *H04L 9/30* (2006.01)

(56) References Cited

U.S. PATENT DOCUMENTS

| | | | |
|---|---|---|---|
| 2002/0120856 | A1 | 8/2002 | Schmidt et al. |
| 2006/0253577 | A1 | 9/2006 | Castaldelli et al. |
| 2008/0159540 | A1 | 3/2008 | Maetz et al. |
| 2011/0258462 | A1* | 10/2011 | Robertson ............... G06F 21/31 713/193 |
| 2014/0068238 | A1 | 3/2014 | Jaber et al. |
| 2014/0317394 | A1* | 10/2014 | Buhler .................. G06F 9/4416 713/2 |
| 2015/0067314 | A1* | 3/2015 | Strauss ................. G06F 21/572 713/1 |
| 2016/0148597 | A1* | 5/2016 | Hamid .................... G06F 21/31 345/173 |
| 2017/0111354 | A1 | 4/2017 | Buendgen et al. |
| 2018/0097639 | A1* | 4/2018 | Gulati ................... H04L 9/3268 |
| 2020/0184066 | A1* | 6/2020 | Shin ........................ G06F 21/46 |

FOREIGN PATENT DOCUMENTS

| | | |
|---|---|---|
| CN | 105812388 A | 7/2016 |
| CN | 107395552 A | 11/2017 |
| CN | 107395610 A | 11/2017 |
| DE | 10008974 A1 | 9/2001 |
| DE | 10249597 A1 | 7/2004 |
| DE | 102015011920 A1 | 3/2017 |
| GB | 2457172 A | 8/2009 |

OTHER PUBLICATIONS

Office Action dated Dec. 18, 2019 from corresponding German Patent Application No. DE 10 2019 206 302.0.
Wikipedia "Public-Key-Verschlüsselungsverfahren", https://de.wikipedia.org/wiki/Public-Key-Verschl%C3%BCs-selungsverfahren, 2017, [Machine Translated from German].
"Flasher Secure—Protect The Vendors's IP", https://www.segger.com/products/production/flasher/models/flasher-secure/, 2017, Segger Microcontroller Systems, LLC.
Chinese Notice of First Office Action dated Jan. 20, 2024 for the counterpart Chinese Application No. 202080032789.2 and translation of same.

* cited by examiner

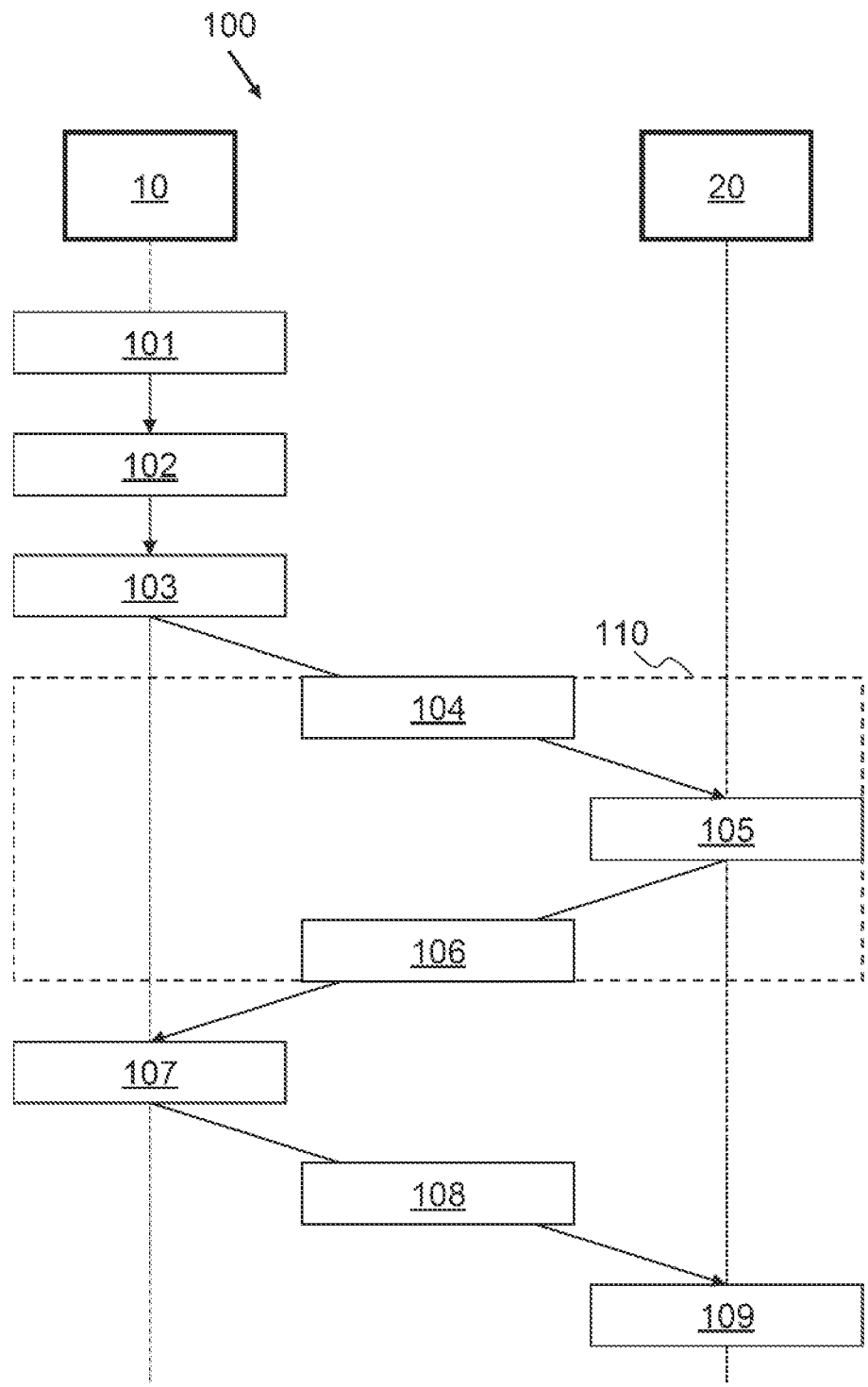

METHOD AND DEVICE FOR TRANSFERRING A BOOT CODE WITH IMPROVED DATA SECURITY

BACKGROUND

The invention relates to a method for transmitting a boot code, with improved data security, from a programming device to a microcontroller. The invention also relates to a programming device and a microcontroller. The invention additionally relates to a use, a program element and a computer-readable medium.

A microcontroller that does not yet have any executable software or firmware on it requires basic software or firmware, the so-called boot code, in order to be able to perform its function. Since this is software that needs to be kept secret, at least in some cases, it is in encrypted form at least in some cases. Since encrypted software per se is not executable on a computer or microcontroller, decryption software must be made available before starting the boot code. Transmitting this decryption software renders both the decryption software and the encrypted boot code susceptible to security-relevant actions by a potential attacker, for example for theft, uncontrolled copying and/or modification of the decryption software and/or the boot code.

BRIEF SUMMARY

It is the object of the invention to improve the transmission security at least in the event of some of the actions mentioned.

Said object is achieved by means of the subject matter of the independent patent claims. Developments of the invention will emerge from the subclaims and the description that follows.

According to a first aspect, a method for transmitting software with improved data security from a programming device to a microcontroller is described.

A microcontroller is a computer that is designed or suitable for performing predefined control tasks. In at least some embodiments, the microcontroller may be designed or suitable for use as a so-called "general purpose computer", e.g. with the tasks of a personal computer. The microcontroller may be a specialized computer or perhaps a standard computer and/or use standard software and/or specialized software to perform at least some of its intended tasks. The software can be e.g. software, firmware, microcode, FPGA-readable instructions and/or files that can or could use some component of the microcontroller to determine the sequence thereof. The boot code can contain ideas and/or routines worth protecting and/or may need to be kept secret. The boot code can be in encrypted form and/or can be transmitted in encrypted form.

The programming device is a computer that is at least suitable for transmitting software, firmware and/or other files to the microcontroller. The programming device is also suitable for executing routines that are based on the generation of a random number. The programming device is classified as trusted. Furthermore, the programming device has at least one boot code and a piece of decryption software, which—if necessary after at least one further decryption—are executable on the microcontroller. The boot code can be transmitted from a programming device to a microcontroller via a line that is not classified as trusted.

The method for transmitting a boot code from a programming device to a microcontroller with improved data security has the following steps:

a) creating, by means of the programming device, a first public key, a first private key and a password.

The public key/private key pair is used as the basis for encryption. The creation of the keys and the password can include the use of a standard routine and/or the use of special hardware to generate the public key/private key pair and the random number.

b) generating, by means of the programming device, a bootloader binary for execution on the microcontroller, the bootloader binary comprising at least:
a bootstrap loader for execution on the microcontroller,
the password,
the first public key encrypted by means of the password,
a set of bootloader routines encrypted by means of the password for execution on the microcontroller, the set of encrypted bootloader routines comprising:
a generation routine for generating a second public key and a second private key, and a decryption routine for decrypting at least the first public key;
a decryption routine, for execution on the microcontroller, for decrypting the bootloader routines encrypted by means of the password;

The bootloader binary can be realized as a compilation of the enumerated software parts or as a chain of these parts. In modifications, the set of bootloader routines encrypted by means of the password can include other and/or further routines and in particular be more extensive. At least the bootstrap loader has a code that is executable directly on the microcontroller. The encryption of the set of encrypted bootloader routines can be used e.g. to prevent manipulation of the bootloader routines essentially during the transmission or during the transmission time ("on-the-fly manipulation").

c) estimating, by means of the programming device, a tolerable total processing time, which consists of the processing times of steps d) to f).

Steps d) to f), which are described in detail below, essentially comprise a transmission time of a first volume of data from the programming device to the microcontroller, a transmission time of a second volume of data from the microcontroller to the programming device, and a defined processing time of predefined routines, as are contained e.g. in the bootloader binary described above. If the bootloader binary comprises more or fewer routines to be executed than the routines described above, then the total processing time can change accordingly. The estimation of a tolerable total processing time "by means of the programming device" can for example be carried out by means of a routine on the programming device that e.g. uses an estimate of the file sizes. The estimate can be based on a series of measurements that repeatedly measures a total processing time of steps d) to f) for illustrative transmissions (or has measured it before the estimate) and uses this e.g. to determine a maximum value and/or a time dispersion of the illustrative transmissions. The estimation can e.g. be carried out by a developer and/or supported by means of a tool. The total processing time determined and/or estimated from this series of measurements and/or by means of other methods is communicated to the programming device; the programming device uses this time as an estimated total processing time. A tolerable total processing time can also be determined from the series of measurements—e.g. in the light of the measured time dispersion and/or other factors.

d) transmitting the bootloader binary from the programming device to the microcontroller.

The bootloader binary contains the aforementioned data or—in modifications—contains more or less data or routines to be executed.

In a modification, the password can also be transmitted separately from the other parts of the bootloader binary; this can have an impact on the estimated total processing time.

e) executing, by means of the microcontroller,
      the bootstrap loader code,
      the decryption routine for decrypting the bootloader routines encrypted by means of the password, and
      the decrypted bootloader routines.

The bootstrap loader has a code that is executable directly on the microcontroller. The bootstrap loader can for example first execute a "start code", which can e.g. be dependent on specifics of the microcontroller. The bootstrap loader can then execute the decryption routine in order to decrypt the bootloader routines encrypted by means of the password. The password contained (or otherwise conveyed) in the bootloader binary can be used to decrypt these routines. Then—or possibly after a predefined pause—the bootloader routines can be executed. If the bootloader binary contains the routines described above, then the following bootloader routines are executed on the microcontroller:

a generation routine for generating a second public key/private key pair (and possibly for encrypting, by means of the first public key, the second public key), and
      a decryption routine for decrypting the first public key.
   f) transmitting the (possibly encrypted) second public key from the microcontroller to the programming device.
   g) if the actual processing times of steps d) to f) are outside the tolerable total processing time, terminating the method.

The running and/or transmission times of the above-described steps of the method—and possibly also predefined variations thereof—can be predetermined within a narrow framework and/or measured with small deviations (e.g. in a series of measurements, as described above). For example, a tolerable total processing time for steps d) to f) can be determined from a series of measurements of processing times—e.g. in the light of the measured time dispersion and/or other factors—(e.g. within a narrow time frame). This tolerable total processing time can then be compared with the actual processing times. The programming device can therefore e.g. wait, starting with step d), for the end of the transmission of step f) only for as long as has been determined as the tolerable total processing time.

h) if the actual processing times of steps d) to f) are within the tolerable total processing time, encrypting, by means of the programming device, the boot code by means of the second public key and transmitting an encrypted boot code from the programming device to the microcontroller.

The method described can thus be used to transmit the boot code to the microcontroller much more securely. This at least substantially hampers and/or prevents an attacker in/from e.g. concurrently reading the bootloader binary, modifying it and/or loading a modified bootloader binary onto the microcontroller instead of the original bootloader binary. This advantage exists even if a potential attacker should be capable of concurrently reading and/or of manipulating the communication between the programming device and the microcontroller (and in the opposite direction) in real time. This is because e.g. the tight time constraints (and the check) mean that e.g. an interruption to the transmission by a potential attacker would be noticed. In addition, actions that would be necessary for manipulation would take too long and would therefore be noticed. These actions can include e.g. reading, identifying, manipulating and transmitting the manipulated bootloader binary. The encrypted boot code is also difficult to read and to use for unauthorized programming of a microcontroller.

In one embodiment, the tolerable total processing time is defined by a maximum total processing time, a minimum total processing time or a time window between the maximum total processing time and the minimum total processing time.

This embodiment makes it possible e.g. to detect if a potential attacker interrupts the transmission and/or e.g. uses a routine to replace parts of the bootloader binary, because this results in steps d) to f) taking too long, i.e. exceeding the tolerable total processing time. This embodiment also makes it possible to detect if, after (or "immediately" after) discovering the transmission in step d), a potential attacker carries out a transmission as expected in step f), because this transmission would be able to take place faster than a minimum total processing time. Using a time window can combine these advantages.

In some embodiments, the set of encrypted bootloader routines (in the bootloader binary) further comprises a routine for producing a pause of a predefined duration. This routine is executed on the microcontroller in step e) in addition to the bootloader routines mentioned above. These embodiments can have an altered total processing time.

This routine can include a predefined number of repetitions of a command of a defined length. The duration of the pause can be selected by means of a random number generator. The duration of the pause can be between a predefined minimum and maximum length. The duration of the pause is known only to the programming device; therefore, this embodiment allows the security, which is improved by a check on the total processing time, to be improved further.

In some embodiments, the set of encrypted bootloader routines (in the bootloader binary) further comprises a read protection routine. This routine is executed on the microcontroller in step e) in addition to the bootloader routines mentioned above. These embodiments can have an altered total processing time.

This routine can e.g. include the setting of a register that determines read protection for certain areas of the memory or the entire memory of the microcontroller. This can prevent e.g. the boot code and/or other memory areas of the microcontroller from being read.

In some embodiments, the set of bootloader routines further comprises a routine for reading a serial number of the microcontroller, and the boot code further comprises the serial number, having the further step of:

f1) additionally transmitting the serial number from the microcontroller to the programming device. These embodiments can have an altered total processing time.

This can e.g. ensure that the boot code is executed only on this microcontroller—or possibly on a family of microcontrollers. The serial number can also be used for further specific modifications of the boot code that e.g. are useful and/or required for a family of microcontrollers.

In one embodiment, the bootloader binary further comprises the first public key. Furthermore, this embodiment comprises the step of:

f2) if the first public key sent by the microcontroller differs from the first public key sent by the programming device, terminating the method.

Step f2) is carried out after step f)—and possibly after step f1)—and before steps g) and h). This embodiment can have an altered total processing time.

This check further increases the probability of a manipulation being detected.

Another aspect relates to a programming device for transmitting a boot code, with improved data security, to a microcontroller, the programming device being designed to
- create a first private key and a password;
- generate a bootloader binary for execution on the microcontroller, the bootloader binary comprising at least:
  - a bootstrap loader,
  - the password,
  - the first public key encrypted by means of the password,
  - a set of bootloader routines encrypted by means of the password for execution on the microcontroller, the set of encrypted bootloader routines comprising:
  - a generation routine for generating a second public key and a second private key, and
  - a decryption routine for decrypting the first public key; and
  - a decryption routine, for execution on the microcontroller, for decrypting the bootloader routines encrypted by means of the password;
- estimate a tolerable total processing time;
- transmit the bootloader binary from the programming device to the microcontroller;
- receive at least one second public key from the microcontroller;
- if the actual processing times from the transmitting of the bootloader binary to the receiving of the second public key are outside the tolerable total processing time, terminate the method; and
- if the actual processing times from the transmitting of the bootloader binary to the receiving of the second public key are within the tolerable total processing time, encrypt the boot code by means of the second public key and transmit the encrypted boot code to the microcontroller.

Another aspect relates to a microcontroller for transmitting a boot code, with improved data security, from a programming device, the microcontroller being designed to
- receive a bootloader binary from the programming device, the bootloader binary comprising at least one bootstrap loader code, the password, a decryption routine for decrypting bootloader routines encrypted by means of the password, and a set of bootloader routines encrypted by means of the password;
- execute the bootstrap loader code, the decryption routine and the decrypted bootloader routines;
- transmit at least the second public key to the programming device; and
- receive an encrypted boot code from the programming device.

Another aspect relates to the use of a programming device as described above and/or below, a microcontroller as described above and/or below and/or a method as described above and/or below for transmitting a boot code, with improved data security, from the programming device to the microcontroller.

Another aspect relates to a program element that, when executed on a programming device, instructs the programming device to carry out the method as described above and/or below.

Another aspect relates to a computer-readable medium on which a program element as described above is stored.

BRIEF DESCRIPTION OF THE DRAWINGS

For further clarification, the invention will be described on the basis of embodiments shown in the FIGURES. These embodiments are intended to be understood merely as examples and not as limitations.

FIG. 1 schematically shows a message sequence chart according to an embodiment.

DETAILED DESCRIPTION

FIG. 1 shows a message sequence chart (MSC) 100 that schematically outlines an embodiment of a method for transmitting a boot code, with improved data security, from a programming device 10 to a microcontroller 20. The programming device 10 is a computer that is at least suitable for transmitting software, firmware and/or other files to the microcontroller. Furthermore, the programming device 10 is suitable for executing routines that are based on the generation of a random number. The microcontroller 20 is a computer that is designed or suitable for carrying out predefined control tasks. For this purpose, the microcontroller 20 requires basic software or firmware, the so-called boot code, in order to be able to perform its function. If there is not yet any executable software or firmware on the microcontroller 20, the microcontroller 20 requires basic software or firmware, the so-called boot code.

In a step 101, the programming device 10 creates a first public key, a first private key and a password. In a step 102, the programming device 10 generates a bootloader binary that is suitable for execution on the microcontroller 20. The bootloader binary comprises at least
  a bootstrap loader for execution on the microcontroller 20, the password, the first public key encrypted by means of the password, a set of bootloader routines encrypted by means of the password that are suitable for execution on the microcontroller 20, and a decryption routine that is suitable for execution on the microcontroller, for decrypting the bootloader routines encrypted by means of the password. The set of encrypted bootloader routines comprises at least one generation routine for generating a second public key and a second private key, and
  a decryption routine for decrypting the first public key. In addition, the set of encrypted bootloader routines can, optionally, for example also comprise a routine for producing a pause of a predefined duration, a read protection routine, a routine for reading a serial number of the microcontroller and/or further routines that are suitable for execution on the microcontroller 20. The pause is advantageously produced by performing functions that have a runtime behavior that is characteristic of the respective microcontroller. As such, the pause duration should be understood as an identifiable feature of the microcontroller.

In a step 103, the programming device 10 estimates a tolerable total processing time 110, which consists of the processing times of steps 104 to 106 that follow (marked by the dashed box 110). The estimation can e.g. access statistics of time periods of a series of measurements carried out previously. In a step 104, the bootloader binary is transmitted from the programming device 10 to the microcontroller 20. The transmitting can e.g. be initiated and/or carried out by the programming device 10.

In a step 105, the microcontroller 20 executes the bootstrap loader code, the decryption routine for decrypting the bootloader routines encrypted by means of the password and at least part of the set of bootloader routines encrypted by means of the password. In a step 106, at least the second public key is transmitted from the microcontroller 20 to the programming device 10. The transmitting can e.g. be initiated and/or carried out by the microcontroller 20.

In a step 107, the programming device 10 checks the actual processing times of steps 104 to 106. If the actual processing times of steps 104 to 106 are outside the tolerable total processing time, the method is terminated (not shown in the MSC). Depending on the bootloader routines and/or further plausibility checks and/or checks, the method can also be terminated at other points.

If the actual processing times of steps 104 to 106 are within the tolerable total processing time, the boot code is encrypted by means of the second public key and, in a step 108, the encrypted boot code is transmitted from the programming device 10 to the microcontroller 20. In a step 109, the boot code and/or further program sections can then be executed on the microcontroller 20.

The invention claimed is:

1. A method for transmitting a boot code, with improved data security, from a programming device to a microcontroller, having the steps of:
   a) creating, by the programming device, a first public key, a first private key and a password;
   b) generating, by the programming device, a bootloader binary for execution on the microcontroller, the bootloader binary comprising at least:
      a bootstrap loader for execution on the microcontroller,
      the password,
      the first public key encrypted by means of the password,
      a set of bootloader routines encrypted by the password for execution on the microcontroller, the set of encrypted bootloader routines comprising:
      a generation routine for generating a second public key and a second private key, and
      a decryption routine for decrypting the first public key; and
         a decryption routine, for execution on the microcontroller, for decrypting the bootloader routines encrypted by the password;
   c) estimating, by the programming device, a tolerable total processing time, which consists of the processing times of steps d) to f);
   d) transmitting the bootloader binary from the programming device to the microcontroller;
   e) executing, by the microcontroller,
      the bootstrap loader code,
      the decryption routine for decrypting the bootloader routines encrypted by the password, and
      the decrypted bootloader routines;
   f) transmitting at least the second public key from the microcontroller to the programming device;
   g) if the actual processing times of steps d) to f) are outside the tolerable total processing time, terminating the method; and
   h) if the actual processing times of steps d) to f) are within the tolerable total processing time,
   encrypting, by the programming device, the boot code by the second public key and transmitting an encrypted boot code from the programming device to the microcontroller.

2. The method as claimed in claim 1,
wherein the tolerable total processing time is defined by a maximum total processing time, a minimum total processing time or a time window between the maximum total processing time and the minimum total processing time.

3. The method as claimed in claim 1,
wherein the set of encrypted bootloader routines further comprises a routine for producing a pause of a predefined duration.

4. The method as claimed in claim 1,
wherein the set of encrypted bootloader routines further comprises a read protection routine.

5. The method as claimed in claim 1,
wherein the set of bootloader routines further comprises a routine for reading a serial number of the microcontroller, and
wherein the boot code further comprises the serial number, having the further step of:
   f1) additionally transmitting the serial number from the microcontroller to the programming device.

6. The method as claimed in claim 1, wherein the bootloader binary further comprises the first public key, having the further step of:
   f2) if the first public key sent by the microcontroller differs from the first public key sent by the programming device, terminating the method.

7. A programming device for transmitting a boot code, with improved data security, to a microcontroller, the programming device being designed to
   create a first private key and a password;
   generate a bootloader binary for execution on the microcontroller, the bootloader binary comprising at least:
      a bootstrap loader,
      the password,
      the first public key encrypted by the password,
      a set of bootloader routines encrypted by the password for execution on the microcontroller, the set of encrypted bootloader routines comprising:
   a generation routine for generating a second public key and a second private key, and
   a decryption routine for decrypting the first public key; and
      a decryption routine, for execution on the microcontroller, for decrypting the bootloader routines encrypted by the password;
   estimate a tolerable total processing time;
   transmit the bootloader binary from the programming device (10) to the microcontroller;
   receive at least one second public key from the microcontroller;
   if the actual processing times from the transmitting of the bootloader binary to the receiving of the second public key are outside the tolerable total processing time, terminate the method; and
   if the actual processing times from the transmitting of the bootloader binary to the receiving of the second public key are within the tolerable total processing time, encrypt the boot code by the second public key and transmit the encrypted boot code to the microcontroller.

8. A microcontroller for transmitting a boot code, with improved data security, from a programming device, the microcontroller being designed to
   receive a bootloader binary from the programming device, the bootloader binary comprising at least one bootstrap loader code, the password, a decryption routine for decrypting bootloader routines encrypted by the password, and a set of bootloader routines encrypted by the password;
   execute the bootstrap loader code, the decryption routine and the decrypted bootloader routines;
   transmit at least the second public key to the programming device; and
   receive an encrypted boot code from the programming device.

* * * * *